Patented Apr. 23, 1935

1,998,756

UNITED STATES PATENT OFFICE 1,998,756

TREATMENT OF DEEP WELLS

John J. Grebe and Sylvia M. Stoesser, Midland, Mich., assignors to The Dow Chemical Company, Midland, Mich., a corporation of Michigan No Drawing. Application October 19, 1934, Serial No. 749,097

20 Claims. (Cl. 166—21)

The invention relates to an improvement in the use of fluid agents, particularly acids, for the treatment of deep wells, especially those yielding oil or gas, to increase the production therefrom.

In the treatment of wells with acids, it has been the practice, as described in U. S. Patent 1,916,122, first to introduce into the well a quantity of a liquid or solution that is substantially inactive toward the earth formation, which liquid or solution is of higher specific gravity than the acid, so as to fill the voids in the earth underlying the producing stratum. By such means the acid, when subsequently introduced, is prevented from draining away from the stratum to be treated and spent ineffectively or detrimentally on non-productive earth below the producing stratum. Such method, however, has certain disadvantages which limit its usefulness. For example, in some wells the underlying formation is readily permeable to such liquids and the latter may be either absorbed in very large volume or lost into the underlying earth, so that the acid cannot be maintained at the desired level in the well with any reasonable quantity of liquid. Another disadvantage is that when fluid pressure is applied to the acid, as is usually done to cause it to penetrate into the stratum to be treated, the supporting fluid may be displaced, thereby permitting the acid to act upon non-producing earth or rock.

The principal object of the present invention is to provide a means for supporting acid or other fluid treating agent in a well at a desired level, which means does not readily penetrate porous earth or rock. Another object is to provide supporting means which, when placed in the formation, is capable of strongly resisting displacement by fluid pressure. Other objects and advantages will appear as the description proceeds.

We have discovered that these and other objects may be obtained by introducing into the well, as a solution or dispersion, an organic jellifying material capable of setting to a firm jelly when mixed with water. Such material has the advantage of being capable of introduction into the well as a liquid dispersion or solution, but after reaching the earth at the base of the well the liquid coagulates and finally becomes a solid or semi-solid jelly which strongly resists displacement through the pores of the earth when subjected to fluid pressure. Such means of closing voids in the earth has the further advantage that, by incorporating in the liquid dispersion of the jellifying material suitable micro-organisms or bacteria capable of acting upon the jelly, it may be subsequently liquefied thereby when a treatment is complete and then easily removed from the well.

The term "organic jellifying material" used herein and in the appended claims means an organic material capable of being dispersed or dissolved in water to make a mobile liquid dispersion or solution, which liquid sets to a jelly after a time.

Suitable organic jellifying materials for the purpose are the carbohydrates and proteins that are capable of forming jellies when mixed with water and allowed to stand at temperatures encountered in the earth formation in which they are to be used. Suitable carbohydrates, for example, are available as by-products of starch manufacture. Another suitable form of material may be prepared readily from starches or polysaccharides by the following procedure: A quantity of starch, e. g. cassava starch, rice starch, arrowroot starch, etc., is mixed with enough water to make a thin paste which is heated to boiling until the starch is cooked or hydrolyzed. The cooked starch is dried at about 80° C., and the dry material ground preferably to a fine powder. The powder so produced when mixed with water in suitable proportions, e. g. 1 to 10 parts of carbohydrate and 99 to 90 parts of water, readily forms a jelly on standing. Suitable jellies also may be made from protein material by mixing the same with hot water (100° F.). For example, 1.5 to 10 parts or more of gelatine mixed with from 98.5 to 90 parts or less of hot water forms a solution which sets to a jelly when cooled below about 90° to 100° F. If desired, dilute salt solutions or brines, often available in oil fields, may be used instead of water.

The consistency of the jelly when set, and the length of time required for the same to set may be varied by varying the proportions as well as the kind of jellifying material employed. Also the temperature at which setting of the jelly can occur varies with the kind of jellifying material. In general, the carbohydrate jellifying materials are capable of setting at higher temperatures than the protein type of material. Inasmuch as earth temperatures at the base of very deep wells in some cases may be higher than the setting temperature of protein jellifying materials (usually about 90° F.) a carbohydrate capable of forming a jelly with water should be used where earth temperatures exceed about 90° F.

In carrying our invention into effect, oil or water standing in the well is removed, if necessary, and then the organic jellifying material is introduced into the well preferably as an aqueous solution or dispersion, although the dry material may be washed into the well if desired with water in amount sufficient to make a jelly. After reaching the earth formation the organic jellifying material and water with which it is mixed sets to a firm jelly and effectively acts as a means to seal the pores and voids in the formation at the lower end of the well bore.

The quantity of jellifying material to employ varies according to the nature of the well and the degree to which it is desired to close up the pores and voids in the earth formation. For example, the lower portion of a well cavity may be sealed usually with from 4 to 10 gallons of a mixture of water and a jellifying material. For more extensive sealing operations as much as 50 to 100 gallons or more may be required. Although it is generally preferable to introduce the organic jellifying material into the well as an aqueous solution or dispersion as aforementioned, in some instances, particularly if the earth formation is exceedingly porous or permeable to liquids, the material may be introduced into the well as a dry powder followed by water or the powder may be washed down the bore of the well with water. The water thus used acts to work the material into the pores of the earth and to bring about subsequent jellifying of the material therein.

After introducing the jellifying material into the well with water or as a water solution and allowing it to set therein to a firm jelly, fluid treating agents, such as acids, e. g. hydrochloric, nitric, etc., and/or paraffin solvents, e. g. carbon tetrachloride, naphtha, etc., or the like, may be introduced into the bore of the well and displaced therefrom, if desired, into the contiguous earth by applying pressure without substantially penetrating the jelly therein. The action of such treating agents thereby is confined to the parts of the earth formation not sealed by the jelly, consequently waste of the fluid treating agents is largely or completely prevented. The jelly also strongly resists displacement by fluid pressure. Furthermore, it restrains the entrance of water or brine into the well bore, and is therefore useful for preventing water leakage into oil wells.

It is generally preferable, when using an acid such as aqueous hydrochloric acid in the well, to add to the acid a relatively small percentage of an agent capable of inhibiting the action of the acid on the metal parts of the well as described in U. S. Patent 1,877,504. Also it is preferable to use an acid that forms water-soluble salts with the constituents of the earth formation attacked by the acid and to dilute the acid sufficiently to permit retaining the dissolved earth constituents in solution. For example, aqueous hydrochloric acid solution containing 5 to 20 per cent of HCl is suitable for use in limestone earth formations.

In some cases a substantially permanent seal, such as results from the introduction into the well of our organic jellifying material, is not necessary or desirable, as for example, when it is desired to draw production from still lower strata. In such instances we may incorporate with the jellifying material, either while the latter is dry or after being mixed with water, bacteria or micro-organisms which when acting upon the organic constituents of the jelly convert it into a mobile liquid.

A great number of types of micro-organisms or bacteria are effective for the purpose, although it must be observed that at the base of deep wells the earth temperature is usually considerably higher than ordinary temperatures and bacteria capable of living at such temperatures are the only ones capable of use. The following table lists illustrative examples of micro-organisms capable of converting the jelly into a liquid and the temperature at which they are most active.

| Micro-organism | Temperature in ° F. of maximum activity |
|---|---|
| Bacillus subtillis | 97-133 |
| Bacillus petasitis | 95-122 |
| Bacillus megatherium | 95-122 |
| Bacillus albolactis | 95-122 |
| Bacillus ruminatus | 99-122 |
| Bacillus viridilum | 144-158 |

Spore-bearing micro-organisms, of which those listed in the table are examples, are generally preferable for the purpose.

Inasmuch as the rate of liquefaction of the jelly depends upon the nature of the bacteria and that of the organic jellifying material as well as proportions, the amount of bacteria to be mixed with a given amount of jellifying material is best determined by laboratory test. When such or like bacteria are incorporated in the jellifying liquid, its ability to set is not substantially affected. In the course of 10 hours to several days after setting, however, the bacterial action will have proceeded so far as to convert the jelly into a liquid, which may be withdrawn from the well by pumping, bailing, or allowing the well to flow, if a flowing well.

Among the advantages of our method of treating earth formations into which deep wells are drilled are that it makes possible the effective use in many cases of a smaller volume of fluid treating agent than is usually used; a relatively small volume of inexpensive material suffices to close voids, cavities or pores in an earth formation contiguous to a stratum therein into which it is desired to force other fluid treating agents; fluid treating agents, such as acids and paraffin solvents, even under strong fluid pressure do not substantially displace the jelly through the pores of the earth so that such fluid treating agents may be forced into a contiguous stratum with reduced risk of being fasted through non-productive earth at the base of a well, the treatment of which earth is not desirable or necessary.

Although we have described the invention more particularly in connection with the treatment of wells with such fluid treating agents as acids and paraffin solvents, we do not wish to be limited to such agents inasmuch as the invention may be used in combination with other fluid treating agents such as water containing emulsifying agents by means of which fixed oil may be recovered from the earth, as in the usual flooding processes or the like.

The term "fluid treating agent" includes acids, paraffin solvents, and solutions intended to liberate fixed oil, or like fluid agent to be introduced into the well to treat the earth formation.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of treating a well, the step which consists in introducing into the well an organic jellifying material.

2. In a method of treating a well, the step which consists in introducing into the well an aqueous solution of an organic jellifying material.

3. In a method of treating a well, the step which consists in introducing into the well an aqueous dispersion of an organic jellifying material.

4. In a method of treating a well, the steps which consist in introducing into the well an organic jellifying material and water.

5. In a method of treating a well, the steps which consist in introducing into the well an organic jellifying material and thereafter introducing a fluid treating agent.

6. In a method of treating a well, the steps which consist in introducing into the well an aqueous solution of an organic jellifying material and thereafter introducing an acid.

7. In a method of treating a well, the steps which consist in introducing into the well an aqueous dispersion of an organic jellifying material and thereafter introducing an acid.

8. In a method of treating a well, the steps which consist in introducing into the well an aqueous dispersion of an organic jellifying material, thereafter introducing an acid, and applying pressure to the acid.

9. In a method of treating a well, the steps which consist in introducing into the well a mixture of a carbohydrate and water capable of forming a jelly, introducing hydrochloric acid, and applying pressure to the acid.

10. In a method of treating a well, the steps which consist in introducing into the well an aqueous solution of an organic jellifying material and thereafter introducing a paraffin solvent.

11. In a method of treating a well, the steps which consist in introducing into the well an aqueous dispersion of an organic jellifying material and thereafter introducing a paraffin solvent.

12. In a method of treating a well, the steps which consist in introducing into the well an organic jellifying material and bacteria capable of converting into a liquid the jelly resulting from mixing the said material and water.

13. In a method of treating a well, the step which consists in introducing into the well a mixture of an organic jellifying material and bacteria capable of converting into a liquid the jelly resulting from mixing the said material and water.

14. In a method of treating a well, the step which consists in introducing into the well a carbohydrate material capable of forming a jelly when mixed with water.

15. In a method of treating a well, the step which consists in introducing into the well a protein material capable of forming a jelly when mixed with water.

16. In a method of treating a well, the steps which consist in introducing into the well a carbohydrate material capable of forming a jelly when mixed with water and introducing water.

17. In a method of treating a well, the steps which consist in introducing into the well a protein material capable of forming a jelly when mixed with water and introducing water.

18. In a method of treating a well, the step which consists in introducing into the well as an aqueous solution a carbohydrate material capable of forming a jelly when mixed with water.

19. In a method of treating a well, the step which consists in introducing into the well as an aqueous dispersion a carbohydrate material capable of forming a jelly when mixed with water.

20. In a method of treating a well, the step which consists in introducing into the well as an aqueous dispersion a protein material capable of forming a jelly when mixed with water.

JOHN J. GREBE.
SYLVIA M. STOESSER.